Sept. 1, 1964    F. J. WAGNER, JR    3,147,458
SYSTEM FOR PROCESSING WELL LOG INFORMATION
Filed June 30, 1958    2 Sheets-Sheet 1

SANDSTONE
SHALE
DOLOMITE
LIMESTONE

Frederick J. Wagner, Jr.    Inventor
By John D. Dussett    Attorney

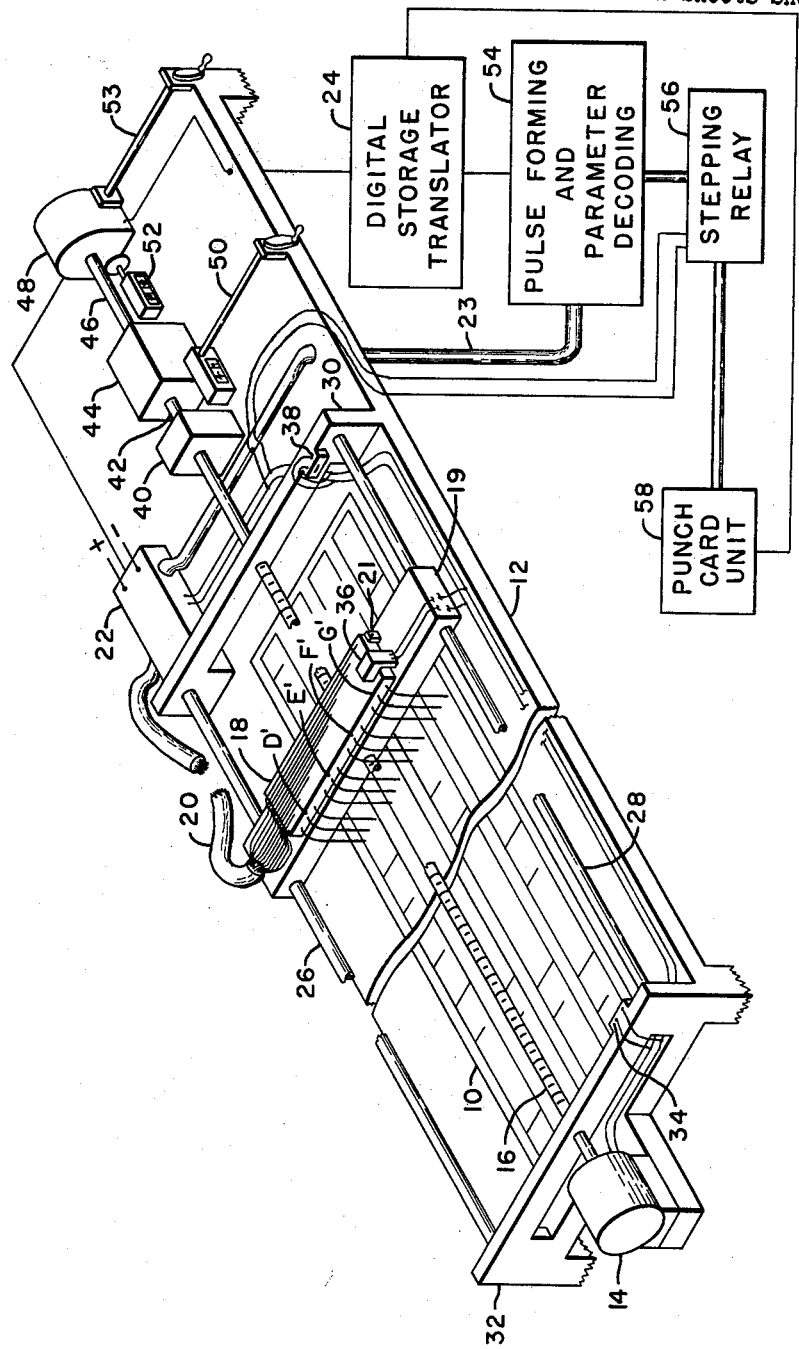

United States Patent Office 3,147,458
Patented Sept. 1, 1964

3,147,458
SYSTEM FOR PROCESSING WELL LOG
INFORMATION
Frederick J. Wagner, Jr., Tulsa, Okla., assignor to Jersey Production Research Company, a corporation of Delaware
Filed June 30, 1958, Ser. No. 745,493
4 Claims. (Cl. 340—15.5)

This invention very broadly relates to a system for obtaining information from a visual presentation of indications of subsurface strata, formations, and their various characteristics. It is especially suited and intended for use in conjunction with a system of processing data obtained from well logs on a high speed digital computer.

In the search for oil and other petroleum fluids, boreholes are drilled in the earth's surface to great depths. To determine more of the characteristics and the types of the various formations or strata encountered, various well logs are normally run. The term "well log" as used herein shall mean a record with respect to depth of parameters of subsurface formations or strata which have been penetrated by a borehole and may include electric logs, driller's logs, gamma ray logs, or any of numerous types or combinations thereof. By studying these various logs, one skilled in the art can determine, with a rather high degree of accuracy, valuable subsurface knowledge such as information concerning which zones or substratal formations may contain oil or gas. An indication of the permeability, porosity, etc., of the various formations can also be determined. By studying a group or series of logs for a number of wells in the same geographical area, the shape and size as well as other characteristics of subsurface structures may be determined.

In making a geological study of a given area, one skilled in the art of interpreting well logs normally studies individual well logs separately and compiles a tabulation of the various parameters desired. The interest is normally to preserve various parameters such as lithology, porosity, permeability, etc. A tabulation of such information interpreted from the log is prepared manually and then put into various forms for further use and stored. If desired, the information may be hand punched on to punch cards for further use in automatic computing machines. While this method is valuable in obtaining information and preserving it, it is normally the practice to limit the amount of information thus obtained in order to lessen the tremendous task of recording and preserving such information. As an example, if there are four separate zones of a particular sand encountered over a given interval of a log being studied, the information preserved shows the total thickness of the four zones but not the depths at which each zone is encountered. While it may be desired to record the depths of the various sands encountered, it is recognized that the task it too great to be done manually and is therefore usually not done. In other words, although the present manual system of processing well logs is of value in defining oil reservoirs and their characteristics, it is commonly recognized that this system is exceedingly bulky and does not fully record all desired information. It is therefore evident that there is a need for simplifying this process and improving or increasing the amount of data which may be recorded. The system disclosed herein supplies this need.

One object of the present invention is to provide an improved and simplified system for accelerating and facilitating the processing of information from well logs. Other objects will be explicitly described or will be readily apparent from the following description.

In a broad aspect, this is a system used to transfer data from well logs to punched cards for further use on automatic computers or on tape or other means of storing or recording such transcribed information. The lithologies, intervals or other parameters, shown by the response of the curves or other visual indications on the log being studied, are interpreted by one skilled in the art. The desired parameters are then manually indicated on a multi-channel recording medium in which channels are arranged side by side and with the length of the channels made proportional to the scale of the well log.

The multi-channel recording medium may be any convenient type capable of receiving a record which may be reproduced therefrom. For example, it may be the well log itself, magnetic tape, ordinary or transparent paper, or the like. However, it is preferably a separate sheet of paper which has a plurality of vertical columns, a separate vertical column for each desired parameter. The vertical scale of the column is preferably the same as the scale of the well log. The occurrences of selected parameters are indicated on the recording medium in the proper vertical column at intervals spaced vertically corresponding to the depth occurrence of the indications of the parameter on the log under study. The recording medium in this instance then becomes, in effect, a base form with an overlay of marks which are indicative of the positions of various parameters. The columns with the various parameters' relative positions or values indicated thereon are thereafter scanned by scanning means of a character capable of signaling a recorder upon detecting the indications which have been placed in the vertical columns. Means are provided for recording the relative position of the scanning means at the instant such signal is received.

A preferred embodiment of this invention relates to a system for extracting desired information from a well log. For example, it is assumed that it is desired to extract the depth and the thickness of each separate zone of various sandstone, shale, limestone, and dolomite zones encountered through a given interval in a well log. The recording medium may conveniently take a base form of four vertical columns placed upon ordinary paper with one column for sandstone, one for shale, one for limestone, and one for dolomite. The vertical scale is preferably the same as the scale of the well log. The form is conveniently placed to one side of the well log being studied. A long lateral electrically conductive mark is placed manually in the proper column on the base form at the proper vertical position corresponding to the occurrence on the log of the top of each of the various zones and a relative short mark is likewise placed on the form for the bottom of each zone. An overlay is thus prepared on the base form which is seen then to be a presentation of the parameters selected according to relative depth and type.

The overlay, after being prepared, is mounted upon a support means which is preferably a flat table. Each column is then scanned along its length by a series of styli. Means are provided to record the top and bottom of each zone as well as its thickness upon being actuated by the styli encountering the conductive markings on the overlay. The information thus detected may be recorded on punch cards, various printers such as a Clary printer, etc.

The invention may be better understood by reference to the attached drawing in which:

FIG. 3 illustrates a preferred embodiment of the invention as well as the best mode contemplated for carrying out the invention.

Figures 1, 2:
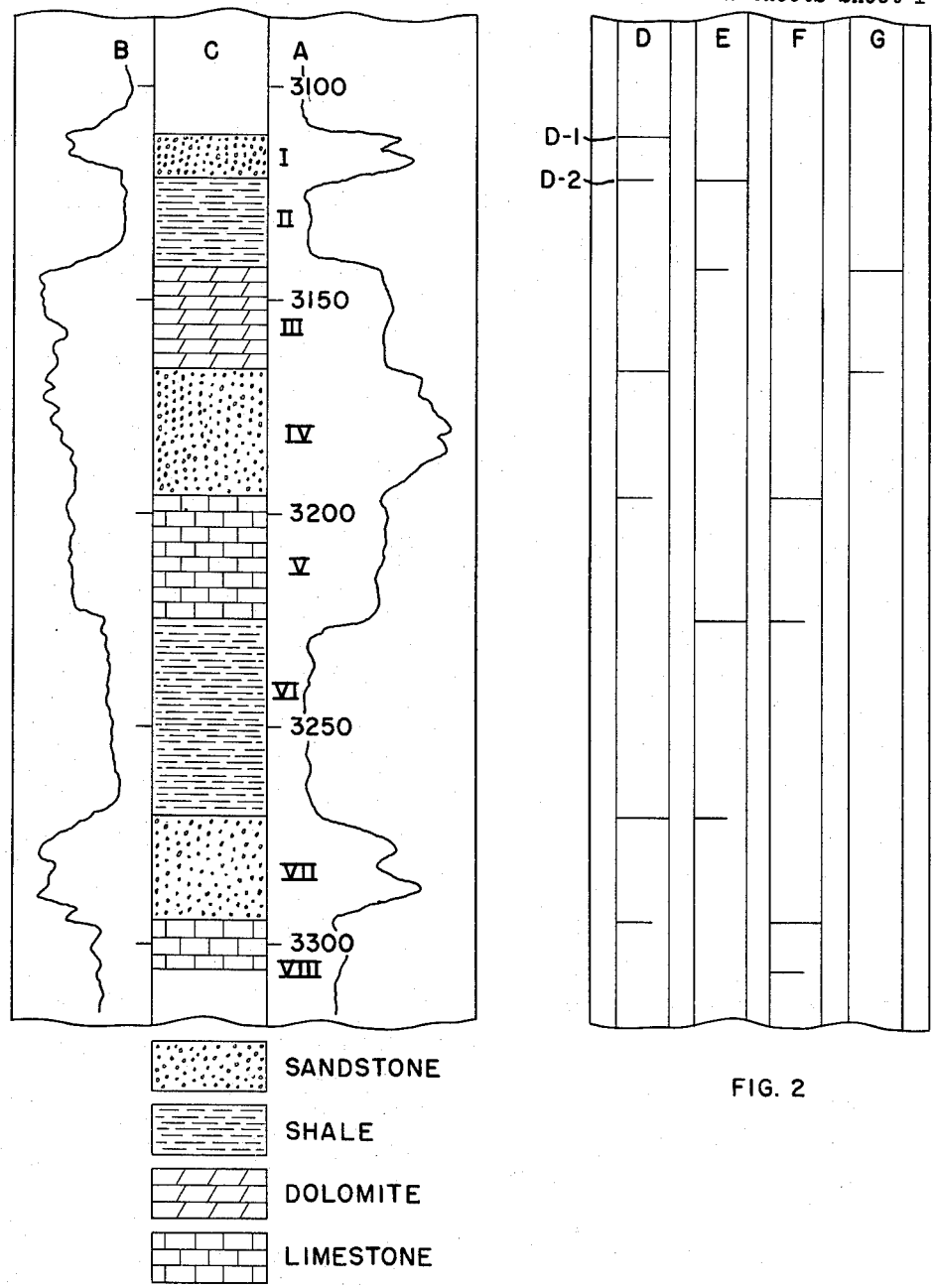
FIG. 1 illustrates an interval of a typical electric log taken from a borehole.
FIG. 2 illustrates an overlay prepared from the typical log of FIG. 1.

Referring especially to FIGURE 1, which shows a typical electric well log, there is illustrated, on the right, curve A which is a resistivity log and, on the left, curve B which is a self-potential log. Resistivity logs and self-potential logs are well known to those skilled in the art. By studying curves A and B, one skilled in the art can determine with considerable accuracy the nature and characteristics of the underground strata encountered. For example, in an interval from 3100' to 3300', which this segment of the log covers, there are four different types of strata encountered; namely, sandstone, shale, limestone, and dolomite. Column C illustrates the positions and thicknesses of the various strata within this interval. In the practice of this invention, column C will seldom be filled in as illustrated in FIG. 1 but it is set forth here to aid in the explanation of this system.

FIG. 2 illustrates an overlay which has been prepared from the well log of FIG. 1. As will be observed in FIG. 1 in the interval 3100' to 3300', there are four different parameters encountered, that is, four types of rock units—namely, sandstone shale, limestone, and dolomite. Accordingly, a base recording form upon which the overlay shown in FIG. 2 is prepared is used which has four vertical columns D, E, F, and G. The base form is preferably of the same scale as the log and is conveniently placed beside the well log. At the position where the top of sandstone section I is encountered, a long line is drawn across column D and at the base of sandstone section I, a shorter line is drawn. These lines are made with conducting silver ink, a pencil of a character to make an electrically conductive mark, or the like. In column E, which has been set aside for shale, a long line is drawn horizontally or laterally across the column at the position on the base form corresponding to the depth to the top of shale section II. Likewise, at the position corresponding to the depth of the bottom of section II, a short line is drawn horizontally in column E. These tops and bottom of the various zones encountered in the interval under study are "picked" or interpreted by one skilled in the art, and the horizontal marks are placed on the base form manually in the proper column at the proper position. This procedure is continued until the entire interval under consideration has been interpreted and transcribed to the recording base form, thereby forming an overlay as illustrated in FIG. 2.

Referring especially to FIG. 3 in which the best mode contemplated for carrying out the invention is illustrated, it will be seen that the base form with its overlay is herein designated numeral 10 for convenience and is mounted on a horizontal or substantially horizontal support 12. The apparatus illustrated includes motor 14, styli holder 18 and clutch 40 which are all mounted on a common shaft 16. Variable speed reversible type motor 14 drives shaft 16 which in turn drives styli holder 18 along the vertical dimension or length of overlay 10. Styli holder 18 has four sets of styli banks D', E'. F', and G' with each set having three styli which are adapted to scan the length of the columns of the overlay D, E, F, and G. Each stylus bank has three styli which are capable of scanning their respective columns on the overlay 10. Two of the styli are set so as to contact both the long and the short marks during scanning operations while the third stylus is set so as to contact only the long marks and does not encounter the short marks. This feature is conveniently used to facilitate distinguishing the indications of the top and bottom of the various zones.

Leads from the individual styli go through a flexible conduit 20 to a stepping relay unit 22 whose function will be more clearly set forth hereinafter. A suitable type stepping relay is a SD 170 Type 52 made by C. P. Clare and Company, 4719 Sunnyside Avenue, Chicago 30, Illinois. Stepping relay unit 22 is used to connect the proper styli such as bank D' to a pulse-forming and parameter decoding circuit 54 through electrical conductors within conduit 23. Circuit 54 is of a type to receive a low level signal from the styli to which it is connected through stepping relay unit 22, amplify the pulse received, and shape it into a sharp, high level pulse and transmit the high level pulse to the digital storage translator 24. In other words, each time the styli bank encounters one of the conductible marks on overlay 10, pulse-forming circuit 54 transmits a sharp, high level pulse to translator 24. Circuit 54 is also capable of decoding the signal received from the styli bank to which it is connected, i.e., it must determine if the mark detected is representative of the top or of the bottom of the parameter. This may conveniently be accomplished by including in circuit 54 appropriate relay closures to signal the punch card unit 58, through stepping relay 56, for top and bottom determinations as precoded on overlay 10 by the length of conductible marks. For example, one relay may be electrically connected to the styli which encounters only the long mark and is therefore operative when the long mark is detected but is inoperative when the other two styli encounter the short mark. A detailed description of circuit 54 is not believed warranted as one skilled in the art can readily construct a circuit which will perform the required functions.

Digital storage translators as such are well known and widely used in the art. Briefly, it may be stated that translator 24 is a device capable of storing the output from the shaft position of encoder 48 and translating information thus received into contact closures having digital representation. Upon receiving each pulse from circuit 54, translator 24 records the shaft position of encoder 48. A suitable type translator is a type K 106 storage translator which is manufactured and sold by the Datex Division of the G. M. Giannini and Company, Inc., 1307 South Myrtle, Monrovia, California.

A stepping relay 56 is provided between pulse-forming and parameter decoding circuit 54 and a punch card unit 58. Stepping relay 56 may be identical to stepping relay unit 22 and is likewise actuated by closure of contact switch 38. Contact switch 38 is mounted on lateral support 30 which is at one end of support 12 upon which the overlay 10 is placed. It is thus seen that stepping relay 56 and stepping relay 22 are advanced in unison. Each parameter is represented by a position of relay 56, and each such position, as it is assumed by relay 56, is adapted to inform punch card unit 58 which parameter is being scanned. A suitable punch card unit is a Type 523 Gang Punch available from International Business Machine Corporation, 590 Madison Avenue, New York 22, New York.

It is thus seen that by suitable cabling, the output of the translator may be used to correctly operate a numerical printer or the like such as a Clary printer, or a punch card unit such as indicated by numeral 58 which is suitable for use in conjunction with a high speed digital computer. To briefly summarize then, the digital storage translator supplies punch card unit 58 with the correct digital information, the relay units supply the punch card unit with information as to which parameter is being scanned, and circuit 54 informs punch card unit 58 whether the digital representation is representative of the top or bottom of the parameter being scanned.

Styli holder 18 is supported from styli lateral support bar 19 which is supported from longitudinal rods 26 and 28. Styli holder 18 is pivotable about pivot 21. Longitudinal support rods 26 and 28 are supported from support 12 by lateral support members 30 and 32. A contact switch 34 is provided on support 32 which, upon being contacted by bar 19, reverses motor 14 and also energizes relay 36. Relay 36, upon being actuated, lifts styli banks D', E', F', and G', from the base form and overlay 10. A second contact switch 38 is on the other support 30 which is on the opposite end of support 12 from support 32. Contact switch 38, when contacted by stylus bar 19, is likewise used to reverse the direction of motor 14. Contact switch 38 is also of a character capable of actuating stepping relays 22 and 56 and de-energizing relay 36.

Clutch 40 is provided at the opposite end of the drive shaft from motor 14 and is used to connect and disconnect shaft 16 to and from shaft 42. Shaft 42 is connected to transmission unit 44. The output rotational movements of transmission unit 44 are connected to shaft encoder 48 by shaft 46.

Shaft encoder 48 may be any one of a number of conventional units capable of converting shaft position (well log information) into digital information. Thus, the encoder is adapted to convert positions of shaft 46 which are proportional to the depth on the well log into information suitable for recording on punch cards for use in digital computers. A commercially available encoder suitable for this service is manufacutred and sold by the Datex Division of the G. M. Giannini and Company, Inc., 1307 South Myrtle, Monrovia, California, under the general designation of GB-108 Shaft Encoder. Variable speed transmission unit 44 provides for one rotation of shaft 46, or a predetermined fraction of one rotation, for the total rotation of shaft 16 required to drive stylus holder 18 the length of overlay 10. A calibration mechanism 50 is provided with transmission 44 to compensate for varying scales which may have been used on the log and overlay. Calibration mechanism 50 may conveniently be connected to a step gear arrangement of transmission 44 and is capable of adjusting the rotational transmission characteristics of transmission 44 so that the proper number of revolutions of shaft 42 will result in the correct rotation of shaft 46. Transmission 44 and calibration mechanism 50 are similar to the speed changing mechanism used in conventional machine lathes. Adjusting means 53 is provided with the encoder to correctly position the encoder for the depth of the top of the various intervals under consideration. A depth indicator 52 is provided with adjusting means 53 and visually indicates the angular position of the encoder preferably in the same units of measurement as the units used in measuring the depth to the top of the section under consideration. Storage unit 24 is of a character to receive digital information from encoder 48 when signaled by the styli making contact with the conductive marks of the overlay.

Having thus described the apparatus of FIGURE 3 and the manner in which the overlay of FIGURE 2 is prepared, attention is now directed toward a brief description of the operation of the unit. The base form and overlay 10 illustrated in FIGURE 2 are placed upon support 12 with the upper end placed conveniently at lateral support 30 and the stylus is positioned to ride upon the overlay. The overlay is positioned properly with respect to a base reference line on the support. Stepping relay unit 22 is adjusted so that the three leads from stylus bank D' are connected to pulse forming and parameter decoding circuit 54. Calibration mechanism 50 is then set as necessary to accommodate the scale of the overlay, and the encoder is adjusted to compensate for the depth of the top of the interval under consideration. One revolution of shaft 46 can of course represent any interval of depth; however, for most wells whose depths are less than 10,000' one revolution of shaft 46 will be representative of 10,000'. After the various calibrations and adjustments have been completed, motor 14 is started. This drives stylus holder 18 longitudinally with respect to the overlay. When styli bank D' contacts line D-1, which is a long horizontal line representing the top of sandstone section I and illustrated more clearly in FIG. 2, all three styli are electrically connected through long horizontal mark D-1. A circuit is thus completed through all three leads connecting styli D' through step relay 22 to pulse-forming and parameter decoding circuit 54. At this instant a sharp pulse is transmitted from circuit 54 and signals digital storage translator 24 to inform punch card unit 58 of the shaft position of encoder 48. In other words, the translator 24 supplies punch card unit 58 with information representative of the depth of the parameter indicated by the conductible marked detected. Circuit 54 also informs punch card unit 58 that a long mark has been encountered which indicates the top of the parameter. As stylus series D' contacts line D-2 representing the bottom of sandstone section I only two of the styli are connected by line D-2 with the third stylus passing to one side of the mark. Circuit 54 at that instant signals translator 24 to sample the position of encoder 48. Translator 24 translates the shaft position of encoder 48 into a digital representation and transmits such digital representation to punch card unit 58. As a short conductible line has been encountered, circuit 54 informs punch card unit 58 that that digital representation is representative of the bottom of the sandstone section. This procedure is repeated until the depth to the top and bottoms of sandstone intervals IV and VII have been sent to storage unit 24. After Column D has been scanned through all sandstone sections, stylus bar 19 contacts switch 34 which action reverses motor 14 and also energizes relay 36 which raises the styli from the base form and overlay 10; the motor being reversed drives lateral support bar 19 and styli holder 18 to the other end of the support which corresponds to the top of the interval presented on the overlay. When lateral support bar 19 reaches the other end of the support, it strikes contact switch 38 which reverses motor 14, de-energizes relay 36 thereby lowering the styli to the overlay, and also actuates stepping relay 22 so that styli bank designated E' will be connected to circuit 54. Contact switch 38 also actuates stepping relay 56 which informs punch card unit 58 that another parameter is being scanned, which in this case is shale occurrences indicated in coumn E. Column E of the overlay is then scanned for the depths of the various shale sections similarly as was column D for sandstone. Columns F and G of the relay are then scanned, in proper order, for information concerning limestone and dolomite, respectively. The speed of motor 14 during the scanning operations is determined largely by the frequency of occurrence of marks in the column of the overlay being scanned and the ability of storage unit 24 to receive and store digital information.

The information thus obtained may be used for many purposes. For example, the information may be used with an electronic plotting machine for automatic construction of a structural map of various formations. A suitable electronic plotting machine is commercially available from Benson-Lehner Corporation, 11930 Olympic Boulevard, Los Angeles, California, under the designation Electroplotter Model S. Information recorded is also readily available for construction of various maps such as geometrical maps, lateral variability maps or vertical variability maps.

Basic advantages of this system include eliminating manual recording of data, eliminating errors encountered in transferring data, reducing the time spent recording and calculating data for maps and providing data which are immediately ready for automatic machine data processing.

It is apparent that numerous changes and modifications in this invention may be made without departing from the scope thereof. It will be understood that the apparatus systems contained in the above description are merely representative or illustrative and are not limiting.

The invention claimed is:

1. An apparatus for extracting information from an overlay having individual columns for different parameters with relatively long marks being placed laterally across one column indicating the top of a certain parameter and a mark shorter than said long mark indicating the bottom of said parameter as interpreted from a well log, said apparatus comprising a flat support means adapted to receive said overlay, scanning means including a stylus holder having one bank of styli adapted to follow each said column on said overlay with each said bank having three styli so positioned that all contact said long marks on said overlay and two contact said short marks, a motor, a shaft driven by said motor and adapted to drive said stylus holder the length of said overlay, an encoder coupled to said shaft, and recording means adapted to record the angular position of said encoder when said scanning means detects said long marks and said short marks.

2. An apparatus for extracting information from an overlay having individual columns for different parameters thereon with detectable marks placed laterally across a column indicating the occurrence of a certain parameter as interpreted from a well log, said apparatus comprising: a support for said overlay; a plurality of scanning head means arranged in a row perpendicular to the columns on the overlay when placed on said support, there being a scanning head means for each column of the overlay, each scanning head means being of a character to detect a mark in its associated column; means to move said support relative to at least one scanning head means and in a direction perpendicular to the row of plurality of scanning head means; a recording unit; means for providing information indicative of the relative position of said row of plurality of scanning heads with respect to said support; and connecting means connecting each scannling head means and said means for providing information with said recording unit, said recording unit being of a character to indicate thereon the relative position of, and the parameter indicated by each mark detected.

3. An apparatus for extracting information from an overlay having a plurality of vertical columns upon which detectable marks have been placed corresponding to the information interpreted from a well log which comprises:
a support means to receive said overlay;
scanning means including a scanning head for each column of said overlay from which it is desired to extract information, each scanning head being capable of detecting a mark in its associated column;
a motor;
a shaft driven by said motor, said shaft being connected to drive said scanning heads along the length of said overlay;
encoder means coupled to said shaft, the output of said means providing information indicative of the angular position of said shaft;
recording means;
connecting means connecting each said scanning head and said encoder means with said recording means, said recording means being of a character to indicate thereon the relative position of and the parameter indicated by each mark detected by each said scanning head.

4. An apparatus for extracting information from an overlay having individual columns for different parameters thereon with detectable marks placed laterally across the column indicating the occurrence of a certain parameter as interpreted from a well log, said apparatus comprising:
a support for said overlay;
a plurality of scanning heads arranged in a row perpendicular to the columns of the overlay when placed on said support, there being a scanning head for each column, each scanning head being of a character to detect a mark in its associated column;
a motor means;
a shaft driven by said motor means, said shaft being connected to drive said scanning heads along the length of said overlay;
recording means;
means responsive to the relative position of said row of plurality of said scanning heads and said support;
connecting means connecting each said scanning head and said means with said recording means, said recording means being of a character to record thereon the relative position of, and the parameter indicated by each mark detected.

References Cited in the file of this patent
UNITED STATES PATENTS

| | | |
|---|---|---|
| 2,617,587 | Carpenter | Nov. 11, 1952 |
| 2,624,848 | Hancock | Jan. 6, 1953 |
| 2,708,267 | Weidenhammer | May 10, 1955 |
| 2,748,487 | Zimmermann | June 5, 1956 |
| 2,752,092 | McDonal | June 26, 1956 |
| 2,821,892 | Merten | Feb. 4, 1958 |
| 2,864,167 | Hall | Dec. 16, 1958 |
| 2,889,549 | Caughey | June 2, 1959 |
| 2,968,793 | Bellamy | Jan. 17, 1961 |